United States Patent
Ghozzi et al.

(10) Patent No.: US 8,045,923 B2
(45) Date of Patent: Oct. 25, 2011

(54) DETECTION OF UNOCCUPIED FREQUENCY BAND

(75) Inventors: Mohamed Ghozzi, Marseille (FR); Michael Dohler, Barcelona (ES)

(73) Assignee: France Telecom, Paris (FR)

( * ) Notice: Subject to any disclaimer, the term of this patent is extended or adjusted under 35 U.S.C. 154(b) by 404 days.

(21) Appl. No.: 12/311,732

(22) PCT Filed: Oct. 2, 2007

(86) PCT No.: PCT/FR2007/052058
§ 371 (c)(1),
(2), (4) Date: Apr. 10, 2009

(87) PCT Pub. No.: WO2008/043936
PCT Pub. Date: Apr. 17, 2008

(65) Prior Publication Data
US 2010/0035551 A1    Feb. 11, 2010

(30) Foreign Application Priority Data
Oct. 12, 2006  (FR) ..................................... 06 08936

(51) Int. Cl.
*H04B 15/00*    (2006.01)
(52) U.S. Cl. ........................................ 455/62; 455/67.11
(58) Field of Classification Search .................... None
See application file for complete search history.

(56) References Cited

U.S. PATENT DOCUMENTS

| 5,311,541 | A | 5/1994 | Sanderford, Jr. |
| 6,850,576 | B2 * | 2/2005 | Fujimura et al. ............... 375/324 |
| 2002/0176386 | A1 | 11/2002 | Singh |
| 2010/0105335 | A1 * | 4/2010 | Ghozzi et al. ............... 455/67.11 |

FOREIGN PATENT DOCUMENTS

WO    WO 2004/021126    3/2004

\* cited by examiner

*Primary Examiner* — Long Nguyen
(74) *Attorney, Agent, or Firm* — McKenna Long & Aldridge LLP

(57) ABSTRACT

An unoccupied frequency band (W) is detected in a telecommunications network by obtaining first values relating to a signal received (r(n)) for respective corresponding times, in this frequency band. Next, a compound signal is obtained in the form of vectors ($Y_n$) respectively associated with these first values, each vector having M components resulting respectively from the products of the first value associated with said vector and M second values relating to the signal received respectively for M offset times (ti) shifted with respect to the time corresponding to said first value, M being a greater integer. Next, at least one first and one second energy vector ($E_L$, $E_H$) are determined, each containing M components corresponding respectively to energy values of the compound signal for the M offset times, respectively on a first frequency band and on a second frequency band, which are situated either side of a reference frequency. Finally, a decision is made as to whether said frequency band is unoccupied on the basis of a comparison of a distribution of the energy values of the compound signal over the first frequency band and of a distribution of the energy values of the compound signal over the second frequency band.

13 Claims, 3 Drawing Sheets

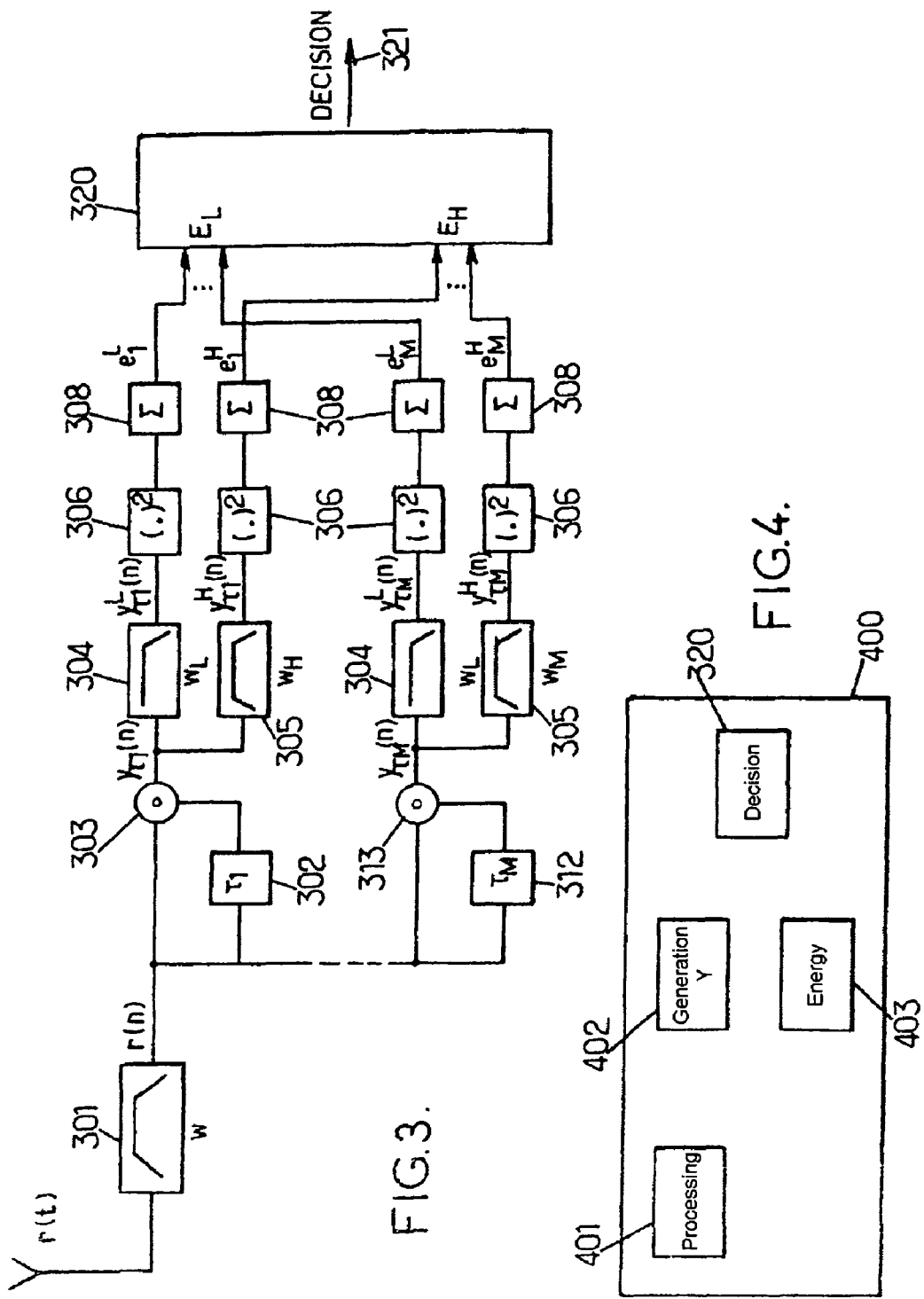

DETECTION OF UNOCCUPIED FREQUENCY BAND

This application claims the benefit of PCT/FR2007/052058 filed on Oct. 2, 2007, and French Application No. 06/08936 filed on Oct. 12, 2006, the contents of which are hereby incorporated herein by reference for all purposes in their entirety

FIELD OF INVENTION

The present invention relates to cognitive radio, and more particularly to the detection of a free frequency band for cognitive radio.

BACKGROUND OF THE INVENTION

The radio frequency spectrum comprises various radio frequency bands which are respectively allocated to different types of use. Thus, for example, the frequency band around 900 MHz, i.e. between around 872 and 960 MHz, has been allocated to the GSM (for Global System for Mobile communications) telecommunications network.

For some periods, for some locations, it is possible that one or more frequency channels on this band remain unused for the type of use to which they are allocated. Measures carried out by the FCC (Federal Communications Commission) thus show that the use of these frequency bands is not efficient, as it is highly probable, at a certain moment and a given place, that one or more frequency bands of the radio spectrum remain unused.

In order to optimize use of the radio spectrum, it is foreseen to allow, in some conditions, the use of free frequency bands of the radio spectrum for types of use other than those for which they have been allocated. In these conditions, for a given frequency band, the users of the type of use to which this frequency band has been allocated have priority, but are not the only ones to be able to use such a frequency band. Specifically, when such a frequency band is free, i.e. when it is not being used by any user and only until a priority user once again uses it, other users may also be authorized to use it.

In order to use the free frequency bands of the radio spectrum in this way, it is necessary that a terminal is able to modify its transmission parameters depending on the surrounding radio context. Such a terminal implements the principles of cognitive radio.

The FCC has already permitted such a use of the frequency bands that are allocated to television.

However, in order to avoid any disturbance to the use of the frequency bands by the priority users, the other users of these frequency bands must meet certain requirements. Thus it is required that such a non-priority user is designed to be able to detect whether a frequency band of the radio spectrum is free or if it is already being used.

To this end, it has already been proposed to detect the availability of such a frequency band by determining the location of the terminal so as to access a database that is able to provide this terminal with information relating to the state of the radio spectrum in the surroundings of the place it is. However, such detection remains static and requires an adequate network infrastructure.

Detection of whether a frequency band is available has also been provided on the basis of the known characteristics of the telecommunications signal to be detected in the frequency band considered. Detection of this sort has in particular the disadvantage of being based on a priori information relating to the signal which is supposed to be detected and which is potentially transmitted in the frequency band considered.

OBJECTS OF THE INVENTION

The problem of the invention is therefore to detect a free frequency band without it being necessary to know a priori the precise characteristics of a signal potentially transmitted in the frequency band considered.

SUMMARY OF THE INVENTION

A first aspect of the invention proposes a method for detecting a free frequency band relating to at least one piece of equipment in a telecommunications network.

The method comprises the following steps:
/a/ obtaining first values relating to a received signal for respective corresponding moments in said frequency band;
/b/ obtaining a composite signal in the form of vectors respectively associated with said first values, each vector having M components respectively resulting from the products of the first value associated with said vector and M second values relating to the received signal for the time shifts respectively in relation to the moment corresponding to said first value, M being an integer greater than or equal to 2; and
/c/ determining at least a first and a second energy vector, each containing M components respectively corresponding to energy values of the composite signal for the M time shifts, respectively over a first frequency band and over a second frequency band lying on either side of a reference frequency; and
/d/ deciding whether said frequency band is free on the basis of a comparison of a distribution of energy values of the composite signal over the first frequency band relating to the M time shifts, with a distribution of energy values of the composite signal in the second frequency band relating to the M time shifts.

Thanks to these provisions, it is possible to decide whether a frequency band considered is occupied, i.e. whether a telecommunications signal is being transmitted in this frequency band or whether it is available, in a simple manner and without a priori knowledge of the specific characteristics of the telecommunications signal that is liable to be transmitted in the frequency band considered.

Specifically, the only condition relating to such a telecommunications signal lies in the initial assumption according to which such a telecommunications signal is a cyclostationary signal in contrast to a noise signal, which for its part is stationary.

Thus, the composite signal is obtained by combining the first values of the signal received in the frequency band considered at determined moments with the second values at times shifted in relation to the determined moments corresponding to the first values.

According to an advantage that the present invention has, detection of free frequency bands is provided which can easily be implemented and which is not based on knowledge of the a priori characteristics of the telecommunications signal that might potentially be transmitted in the frequency band considered. For this reason, such detection may detect any telecommunications signal transmitted in a given frequency band.

To obtain the received signal in the desired frequency band it is possible to filter the received signal over this frequency band.

Next, starting with the energy distribution of this composite signal over two contiguous frequency bands lying on either side of a reference frequency, it is possible to determine whether or not a cyclostationary signal is present in the received signal, and from this fact to decide whether or not the frequency band considered is free.

When it has been decided whether or not the frequency band is free, the terminal considered may then use it, either for transmission or for reception. This aspect is not the subject of the present invention; it will not be set out in detail here. p In step /c/ it is possible to detect whether a cyclostationary signal is present in the received signal on the basis of the comparison of the energy distributions.

In one particular embodiment of the present invention, the comparison of the first and second energy distributions is advantageously carried out on the basis of a nonparametric statistical test of distribution.

The use of a nonparametric test contributes to the implementation of such a method without knowing the specific characteristics relating to the telecommunications signal to be sought in the frequency band considered. Specifically, a nonparametric statistical test, such as the Wilcoxon-Mann-Whitney test for example, makes it possible to test a statistical population without knowing a priori characteristics of this population.

In one embodiment of the present invention, the first frequency band comprises the frequencies with a value between 0 and the value of the reference frequency, and the second frequency band comprises the frequencies with a value between the value of the reference frequency and twice the value of the reference frequency.

By proceeding in this way, it is determined whether or not a cyclostationary telecommunications signal with a cyclic frequency less than the reference frequency has been detected in the frequency band.

Preferably, a reference frequency is chosen so that it has a value higher than a cyclic frequency of a telecommunications signal in the telecommunications network.

In one embodiment of the present invention, the first and second frequency bands are of the same width.

In step /c/ it is possible to carry out the following steps:
/c1/ obtaining, by filtering, vectors associated with the first values, on the one hand a first set of vectors over the first frequency band, and on the other hand a second set of vectors over the second frequency band;
/c2/ obtaining a first, and second respectively, energy vector in the first, and second respectively, frequency band by determining relative to each time shift an energy value for the composite signal by summing the squares of the components of the vectors of the first, and second respectively, set of vectors that correspond to said time shift; and
/c3/ comparing the energy distribution of the composite signal over the first frequency band in relation to the M time shifts, with the energy distribution of the composite signal over the second frequency band in relation to the M time shifts.

A second aspect of the present invention proposes a device for detecting a free frequency band comprising means designed to implement a detection method according to the first aspect of the present invention.

A third aspect of the present invention proposes a piece of equipment for communication via a network comprising a device for detecting a free frequency band according to the second aspect of the present invention.

A fourth aspect of the present invention proposes a computer program intended to be installed in a detection device according to the second aspect of the present invention, comprising instructions suitable for implementing the method according to the first aspect of the present invention when the program is executed by processing means of the detection device.

A fifth aspect of the present invention proposes a recording medium that can be read by a computer on which the computer program according to the fourth aspect of the present invention is saved.

BRIEF DESCRIPTION OF THE DRAWINGS

The invention will be better understood with the help of the drawings, in which:

FIG. 3 shows an algorithmic scheme of the implementation of a method according to an embodiment of the present invention; and FIG. 4 illustrates an architecture of a device for detecting a free frequency band according to an embodiment of the present invention.

MORE DETAILED DESCRIPTION

The present invention is described below in its application to a terminal that wishes to transmit and/or receive signals in a telecommunications network and which has the abilities to use the principles of cognitive radio. Because of this, it is capable of modifying its transmission and/or reception parameters depending on the surrounding radio conditions. There is no limitation on the type of telecommunications network in which the terminal transmits and/or receives.

Figure 1:
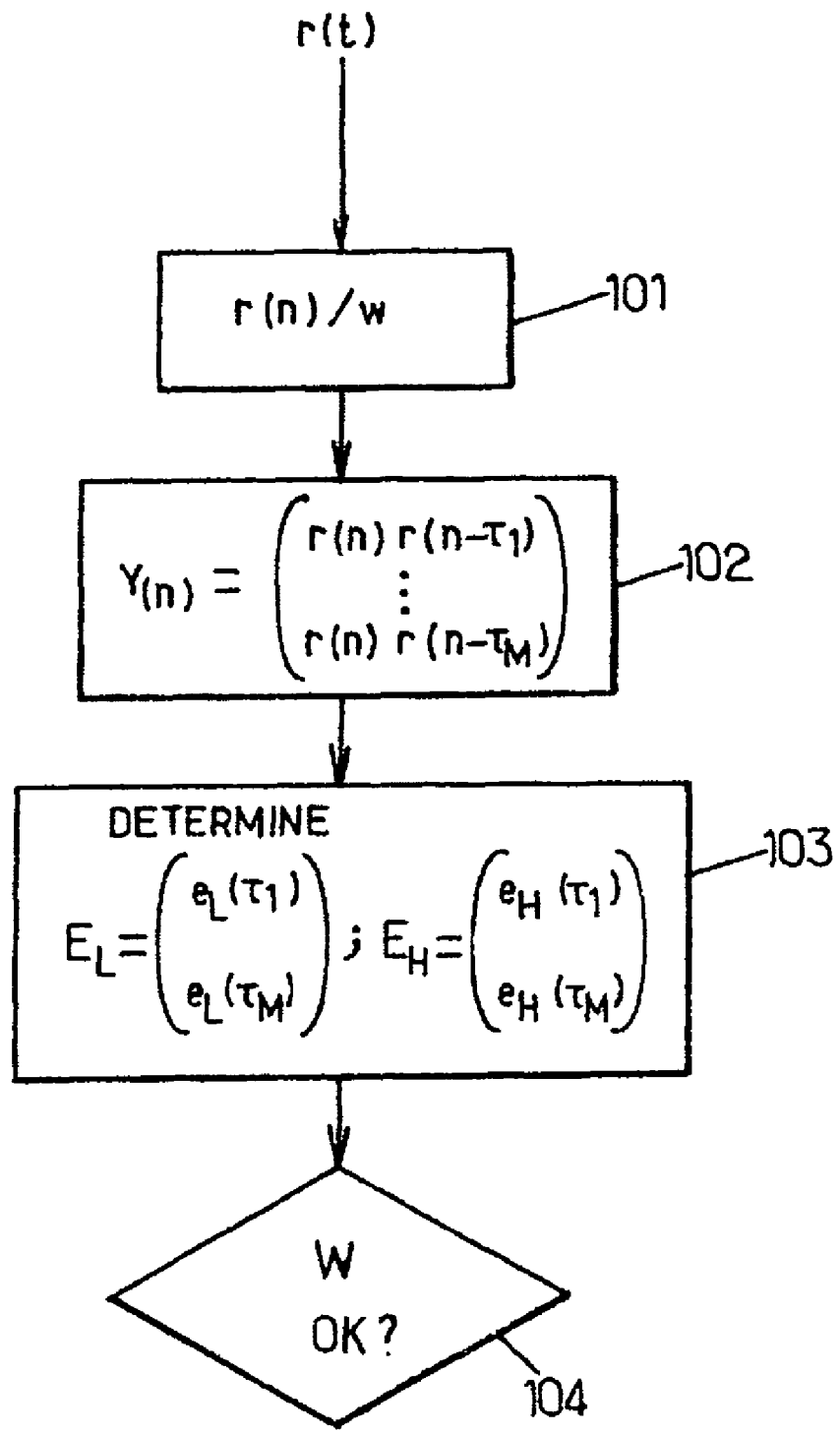
FIG. 1 illustrates the main steps of a method according to an embodiment of the present invention.

FIG. 1 illustrates the main steps of a method according to an embodiment of the present invention.

The terminal wishes to determine whether a frequency band W in the radio spectrum is available. No limitation is imposed by the present invention with regard to the frequency band W.

In a step 101, the terminal filters a received signal r(t) in a frequency band W considered and samples this received signal in order to obtain first values relating to the received signal for moments corresponding to the respective indices n, n being between 1 and Q, Q being any integer. These first values, obtained from the received signal filtered and sampled in this way are referred to as r(n) in the following, for n between 1 and Q.

An object of the present invention is to choose the most probable assumption from the two following assumptions: the received signal r(n) corresponds to a noise signal b(n), or alternatively this received signal r(n) corresponds to a telecommunications signal s(n) to which a noise signal b(n) is added.

The noise signal b(n) corresponds to a noise signal b(t) that has undergone the same processing as that applied to the received signal r(t), i.e. the noise signal b(t) has been filtered over the frequency band W and sampled.

Specifically, in an embodiment of the present invention, deciding whether or not a frequency band W is free amounts to determining the presence or otherwise of a telecommunications signal s(n), i.e. a signal considered to be cyclostationary, in the received signal r(n).

No a priori characteristic is used to detect such a telecommunications signal in the received signal. Thus the cyclic frequency $f_0$ of the telecommunications signal that is potentially present in the received signal is unknown.

In one embodiment of the present invention, a sampled cyclostationary telecommunications signal $s(n)$ satisfies the following equations:

$$m_s(n) = m_s(n+T_0) \quad (1)$$

where $m_s(n) = E\{s(n)\}$ and E is the mathematical expectation operator; and $$R_s(n,\tau) = R_s(n+T_0,\tau) \quad (2)$$

where $R_s(n,\tau) = E\{s(n).s(n+\tau)\}$
where $T_0$ is the cyclic period of value equal to $1/f_0$, and where $\tau$ is a time shift relative to the moment n corresponding to the value of the signal $s(n)$.

It is then possible to expand the series of the Fourier equation (2) and to obtain the following equation:

$$R_s(n,\tau) = \sum_k R_s^{k/N_0}(\tau) e^{j2\pi \frac{k}{N_0} n} \quad (3)$$

where $$R_s^\alpha(\tau) = \frac{1}{T_0} \sum_{l=0}^{T-1} R_s(1,\tau) \cdot e^{-j2\pi (1T_e)\alpha}$$

where $T_e$ is the sampling period of the signal.

In one embodiment of the present invention a noise signal $b(n)$ is considered to be a stationary signal with independent and identically distributed samples.

The signal $b(n)$ therefore satisfies the following equations:

$$m_b(n) = K \quad (4)$$

where $m_b(n) = E\{b(n)\}$ and K is a constant; and $$R_b(n,\tau) = R_b(\tau) \quad (5)$$

where $R_b(n,\tau) = E\{b(n).b(n+\tau)\}$

In the following, the harmonics of the fundamental cyclic frequency $f_0$ of $s(n)$ are considered to be zero-valued.

In a step 102, a composite signal Y is determined in the form of vectors $Y(n)$ with values that respectively correspond to the first relative values of the signal $r(n)$. Thus at a moment with the index n, the composite signal is represented by the vector $Y(n)$ that satisfies the following equation:

$$Y(n) = \begin{pmatrix} y_{\tau 1}(n) \\ y_{\tau 2}(n) \\ \ldots \\ y_{\tau M}(n) \end{pmatrix} \quad (6)$$

where $y_{\tau i}(n) = r(n) \times r(n - \tau i)$ \quad (7)

where $\tau i$ is a time shift relative to the moment with the index n, for i between 1 and M, M being an integer greater than or equal to 2.

In other words, the composite signal vector $Y(n)$ associated with a first value of the signal $r(n)$ has M components, $y_{\tau 1}(n)$, ..., $y_{\tau m}(n)$, respectively resulting from the products of the first value of the associated signal $r(n)$ and M second values of the signal $r(n-\tau i)$, relating to the received signal and time-shifted relative to the moment of the index n corresponding to said first value of the signal $r(n)$ of M time shifts. $\tau i$, for i between 1 and M respectively.

It is now possible to determine whether or not the received signal $r(n)$ comprises a telecommunications signal on the basis of certain statistical characteristics of the composite signal $Y(n)$.

Specifically, from equations (3) and (5) it is possible to write:

$$E(y_{\tau i}(n)) = \sum_{k=-1}^{1} R_r^{k/T_0}(\tau) e^{j2\pi \frac{k}{T_0} n} \quad (7)$$

or alternatively:

$$y_{\tau i}(n) = \sum_{k=-1}^{1} R_r^{k/T_0}(\tau i) e^{j2\pi \frac{k}{T_0} n} + \varepsilon_{\tau i}(n) \quad (8)$$

In equation (8) it is therefore possible to distinguish, on the second side, the first term of the addition, which corresponds to the sum of a pure frequency, and the second term $\varepsilon_{\tau i}(n)$ of the addition, which corresponds to a noise signal. Hence, according to the above, the value of the composite signal $Y(n)$ at the moment n, for the time shift $\tau i$, may be interpreted as the sum of the pure frequency $f_0$ and of an added noise $\varepsilon_{\tau i}(n)$ of mean zero.

Yet the value of a component $y_{\tau i}$ of the composite signal at the moment n for the time shift Ti satisfies the following equation:

$$y_{\tau i} = s(n).s(n-\tau i) + s(n).b(n-\tau i) + s(n-\tau i).b(n) + b(n).b(n-\tau i)$$

where $b(n).b(n-\tau i)$ is approximately equal to the added noise $\varepsilon_\tau(n)$, and
where $s(n).b(n-\tau)$ and $s(n-\tau).b(n)$ are expressions whose value is negligible compared with the value of the added noise.

Hence, taking account of the approximations mentioned above, the following equation can be obtained:

$$y_{\tau i} \approx \sum_{k=-1}^{1} R_r^{k/T_0}(\tau i) e^{j2\pi \frac{k}{T_0}} + B_{\tau i}(n) \quad (9)$$

where $B_{\tau i}(n) = b(n).b(n-\tau i)$

Since $b(n)$ is a stationary signal and with independent and identically distributed samples, a noise signal $B_{\tau i}(n)$ is then also a stationary signal with independent and identically distributed samples.

Figure 2:
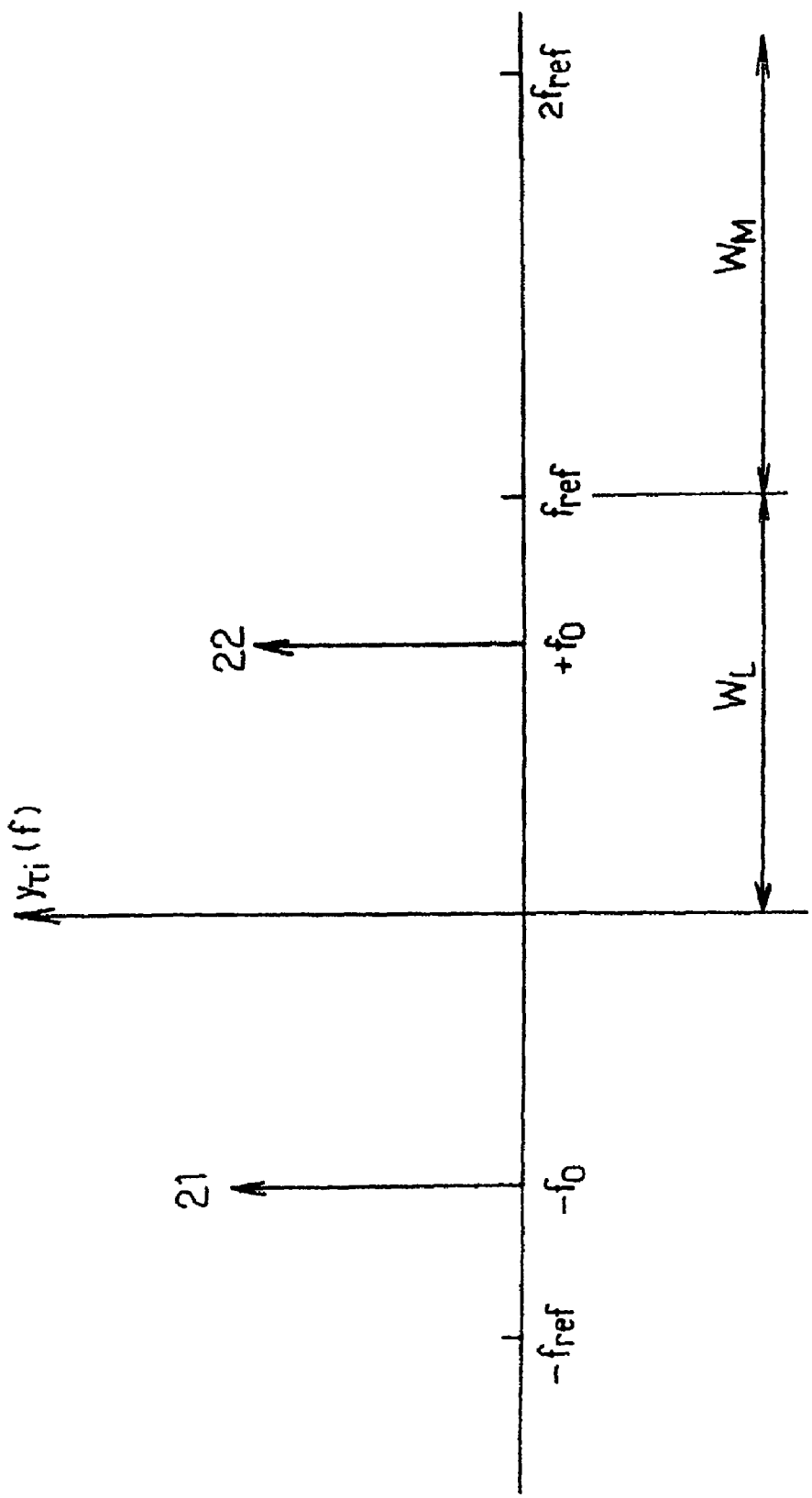
FIG. 2 illustrates a frequency spectrum of the composite signal according to an embodiment of the present invention.

FIG. 2 illustrates in the frequency plan the spectrum of the component $y_{\tau i}(n)$ of the composite signal $Y(n)$ and a level η of the spectrum of the noise signal $B_{\tau i}(n)$. A line 21 and 22 at the frequencies $f_0$ and $-f_0$ respectively then appears more or less clearly depending on the noise level η of the signal $B_{\tau i}(n)$. Thus the presence of a line at the frequency $f_0$ in the component $y_{\tau i}(n)$ of the composite signal conveys the presence of a telecommunications signal of frequency $f_0$ in the received signal $r(n)$ in the frequency band W. If this is the case, the frequency band W is then declared to be occupied.

Starting from this characteristic attached to the components of the composite signal $Y(n)$, the energy distribution of the composite signal $Y(n)$ relating to the M time shifts over a frequency band $W_L$ containing the cyclic frequency $f_0$ is then compared with the energy distribution of the composite signal Y(n) relating to the M time shifts over a frequency band $W_H$ that is contiguous with the frequency band $W_L$ and does not contain the frequency $f_0$. To recall, the frequency $f_0$ is not known. It suffices to be able to increase the value of this frequency $f_0$ to implement an embodiment of the present invention.

This is because a reference frequency value $f_{ref}$ is considered which increases the value of the frequency of a telecommunications signal that is liable to be transmitted in the frequency band W.

Next, the first frequency band $W_L$ containing the potential cyclic frequency $f_0$ of the telecommunications signal sought is defined according to the following equation:

$W_L = [0, f_{ref}]$, and the second frequency band is defined as follows:

$W_H = [f_{ref}, 2f_{ref}]$

It is underlined that in the particular exemplary embodiment described here the two frequency bands $W_L$ and $W_H$ are of the same width. However, the use of two frequency bands of respectively different widths is conceivable.

In one embodiment of the present invention, in order to obtain the energy distribution of the composite signal Y(n) relating to the M time shifts over the first and second frequency bands, in the first and second frequency bands respectively, these components $y_{\tau i}(n)$ are filtered for all $\tau i$, for i between 1 and M, in the first and second frequency bands.

Over the first frequency band $W_L$ a first vector $Y_L(n)$ is obtained which satisfies the following equation:

$$Y_L(n) = \begin{pmatrix} y_{\tau 1}^L(n) \\ y_{\tau 2}^L(n) \\ \dots \\ y_{\tau M}^L(n) \end{pmatrix}$$

and over the second frequency band $W_H$ a second vector $Y_H(n)$ is obtained which satisfies the following equation:

$$Y_H(n) = \begin{pmatrix} y_{\tau 1}^H(n) \\ y_{\tau 2}^H(n) \\ \dots \\ y_{\tau M}^H(n) \end{pmatrix}$$

for i between 1 and M.

One proceeds in this way in relation to all the first values r(n), i.e. for n between 1 and Q.

Next, in a step 103, the energy vectors are calculated for each of the first and second composite signals obtained by respective filtering over the first and second frequency bands $W_L$ and $W_H$.

Thus, the following energy vector is obtained in relation to the first frequency band $W_L$:

$$E_L = \begin{pmatrix} e_L^1 \\ e_L^2 \\ \dots \\ e_L^M \end{pmatrix}$$

The following energy vector is obtained over the second frequency band $W_H$:

$$E_H = \begin{pmatrix} e_H^1 \\ e_H^2 \\ \dots \\ e_H^M \end{pmatrix}$$

where $$e_P^i = \sum_{k=1}^{Q} [y_{\tau i}^P(k)]^2,$$

with P equal to L or H, and i between 1 and M.

Thus, each calculated energy vector $E_L$, or $E_H$ respectively, contains M components, respectively corresponding to the energy values of the composite signal Y for the M time shifts $\tau i$ with i between 1 and M over the first frequency band $W_L$, or over the second frequency band $W_H$ respectively.

Thus possessing an energy vector containing the energies associated with the components of the vectors Y(n) representing the composite signal Y in both the first frequency band and in the second frequency band, it is possible to compare the energy distributions in order to determine whether the frequency band W considered is already being used for the transmission of a telecommunications signal.

To this end, in one embodiment of the present invention, a nonparametric statistical test of distribution, such as a Wilcoxon test, well known to the person skilled in the art, is employed in a step 104.

In these conditions, when the frequency band W considered is already occupied by a telecommunications signal having a cyclic frequency $f_0$ with a value lower than the value of the reference frequency $f_{ref}$, the energy distribution in the first frequency band $W_L$ differs, as a mean, from the energy distribution in the second frequency band $W_H$.

A difference of this type is detected by employing a nonparametric test.

FIG. 3 shows an algorithmic scheme of the implementation of a method according to an embodiment of the present invention. The received signal r(t) is first of all sampled and filtered by a filter 301 over the frequency band W for which it is wished to know whether or not it is occupied. Discrete values r(n) are thus obtained. The discrete signal r(n) is then multiplied by the corresponding discrete signal but shifted by $\tau 1$ by a time delay unit 302, r(n−$\tau 1$), and so on through to the signal shifted by $\tau M$ by a time delay unit 312, r(n−$\tau M$), at the respective signal multipliers 303, 313 (which are not shown in FIG. 3), in order to provide the respective components $y_{\tau i}(n)$, for i between 1 and M, as output. For each of these components $y_{\tau i}(n)$ of the composite signal Y(n) a first filter 304 is applied over the first frequency band $W_L$ and the components $y_{\tau 1}^L(n)$ of the vector $Y_L(n)$ are obtained.

In parallel, a second filter 305 is applied over the second frequency band $W_H$ to all the components of the composite signal Y(n) and the components $y_{\tau 1}^H(n)$ of the vector $Y_H(n)$ are obtained.

Next, for each of the two frequency bands $W_L$ ($W_M$ respectively), the value of each component $y_{\tau 1}^L(n)$ ($y_{\tau 1}^H(n)$ respectively) squared is calculated, i.e. the energy value that corresponds to this component. For each of the M shifts of duration $\tau i$ an adding unit 308 then adds the Q respective energy values obtained for the components $y_{\tau 1}^L(n)$ ($y_{\tau 1}^H(n)$ respectively) for n between 1 and Q, and the components of the energy vector $E_L$ (the components of the energy vector $E_H$ respectively) are respectively obtained.

Finally, the various components $e_i^L$ and $e_i^H$ of the energy vectors $E_L$ and $E_H$ respectively are compared with the energy distribution thus obtained in the first frequency band, on the one hand, and in the second frequency band, on the other hand, by applying a nonparametric test 320 to these two energy distributions. In this way the energy distribution of the composite signal Y over the first frequency band $W_L$ in relation to the M time shifts is compared with the energy distribution of the composite signal over the second frequency band $W_H$ in relation to the M time shifts.

Next, on the basis of this statistical comparison, a decision as to the occupation or nonoccupation of the frequency band W can be made.

Specifically, if the energy distribution in the frequency band $W_L$ differs, as a mean, from the energy distribution in the frequency band $W_H$, then it is decided that the frequency band W is occupied by a telecommunications signal and is as a result not free to be used by a cognitive radio terminal. In the contrary case, it is concluded that this frequency band W is free.

FIG. 4 illustrates a device 400 for detecting a free frequency band according to an embodiment of the present invention. It comprises a processing unit 401 suitable for obtaining Q first values relating to the received signal r(n) for respective corresponding moments n in the frequency band, Q being any integer.

It furthermore comprises a generation unit 402 which comprises time delay units 302, 312, multipliers 303, 313, in order to provide a composite signal (Y) in the form of vectors ($Y_n$) respectively associated with the first values, each composite signal vector having M components resulting respectively from the products of the first signal value associated with the vector and M second signal values relating to the received signal for M time shifts $\tau i$ respectively, for i between 1 and M, in relation to the moment corresponding to the first value.

It comprises a unit for determining an energy vector 403 comprising M components respectively corresponding to the energy of the composite signal for the M time shifts over a determined frequency band.

The determination unit 403 may include a filter suitable for filtering the vectors associated with the first values, over a determined frequency band $W_L$ or $W_H$, and for obtaining a set of vectors $Y_L$ or $Y_H$. It also comprises an energy calculation unit suitable for providing an energy vector $E_L$ or $E_H$ in the frequency band determined by calculating, in relation to each time shift, an energy value of the signal by summing the squares of the vector components of this set of vectors which correspond to the time shift.

Next, it also comprises a decision unit 320 suitable for deciding whether the frequency band considered is free by determining whether a cyclostationary signal is included in the received signal on the basis of a comparison of the energy distribution $E_L$, $E_H$ associated with the composite signal over the first $W_L$ and the second $W_H$ frequency band, lying on either side of the reference frequency $f_{ref}$. This decision unit may advantageously be based on the employment of a nonparametric test.

In one particular embodiment, the units 401, 402, 403 and 320 of the receiver device 400 are software modules forming a computer program and comprising instructions suitable for implementing the previously described method, when the program is executed by processing means (not shown) of the detection device.

This program may be stored on or transmitted by a data medium. The latter may be a material storage medium, for example a CD-ROM, a magnetic disk or a hard disk, or alternatively a medium that can be transmitted such as an electrical, optical or radio signal. The invention therefore also relates to a recording medium that can be read by a computer on which the computer program is saved.

The detection device that has just been described may be integrated in a piece of equipment for communication via a network. This piece of equipment may be a user terminal or a network entity of the telecommunications operator.

Thus, one embodiment of the present invention advantageously makes it possible to determine whether a frequency band can be used by a cognitive radio terminal, as it is available, while remaining convenient with respect to its installation, and while completely avoiding being based on a priori characteristics relating to a telecommunications signal to be detected in the frequency band considered.

The invention claimed is:

1. A method for detecting a free frequency band (W) relating to at least one piece of communication equipment in a telecommunications network, said method comprising the following steps:
   /a/ obtaining first signal values (r(n)), relating to a received signal (r(t)), for respective corresponding moments in said frequency band;
   /b/ obtaining a composite signal (Y) in the form of vectors ($Y_n$) respectively associated with said first signal values (r(n)), a composite signal vector ($Y_n$) associated with a first signal value (r(n)) having M components ($y_{\tau 1}(n)$, $y_{\tau M}(n)$) respectively resulting from the products of the associated first signal value (r(n)) and M second signal values (r(n−$\tau_i$)) relating to the received signal for M time shifts ($\tau i$) respectively in relation to the moment corresponding to said first signal value (r(n)), M being an integer greater than or equal to 2; and
   /c/ determining at least a first and a second energy vector ($E_L$, $E_H$), each containing M components respectively corresponding to energy values of the composite signal for the M time shifts, respectively over a first frequency band ($W_L$) and over a second frequency band ($W_H$) lying on either side of a reference frequency ($f_{ref}$); and
   /d/ deciding whether said frequency band is free on the basis of a comparison of a distribution of energy values of the composite signal over the first frequency band relating to the M time shifts, with a distribution of energy values of the composite signal over the second frequency band relating to the M time shifts.

2. The detection method as claimed in claim 1, wherein the comparison of the energy distributions is carried out on the basis of a nonparametric test of distribution.

3. The detection method as claimed in claim 1, wherein the first and second frequency bands are of the same width.

4. The detection method as claimed in claim 1, wherein in step /c/ it is detected whether a cyclostationary signal is present in the received signal on the basis of the comparison of the energy distributions.

5. The detection method as claimed in claim 1, wherein the first frequency band comprises the frequencies with a value between 0 and the value of said reference frequency ($f_{ref}$), and the second frequency band comprises the frequencies with a value between the value of the reference frequency and twice the value of the reference frequency.

6. The detection method as claimed in claim 1, wherein the reference frequency ($f_{ref}$) is higher than a cyclic frequency ($f_0$) of a telecommunications signal in the telecommunications network.

7. The detection method as claimed in claim 1, wherein in step /c/ the following steps are carried out:
/c1/ obtaining, by filtering vectors associated with the first values, on the one hand a first set of vectors ($Y_L$) over the first frequency band ($W_L$), and on the other hand a second set of vectors ($Y_H$) over the second frequency band ($W_H$);
/c2/ obtaining a first ($E_L$), and second ($E_H$) respectively, energy vector in the first ($W_L$), and second ($W_H$) respectively, frequency band by determining relative to each time shift an energy value of the composite signal by summing the squares of the components of the vectors of the first ($Y_L$), and second ($Y_H$) respectively, set of vectors that correspond to said time shift; and
/c3/ comparing the distribution of the energy values of the composite signal over the first frequency band in relation to the M time shifts, with the distribution of the energy values of the composite signal over the second frequency band in relation to the M time shifts.

8. A device for detecting a free frequency band in a telecommunications network, comprising:
a processing unit (401) suitable for obtaining first signal values (r(n)) relating to a received signal (r(t)) for respective corresponding moments in said frequency band;
a generation unit (402) in order to provide a composite signal (Y) in the form of vectors ($Y_n$) respectively associated with said first signal values (r(n)), a composite signal vector ($Y_n$) associated with a first signal value (r(n)) having M components ($y_{\tau 1}(n), \ldots, y_{\tau M}(n)$) respectively resulting from the products of the first signal value (r(n)) associated to M second signal values ($r(n-\tau_i)$) relating to the received signal for M time shifts ($\tau i$) respectively in relation to the moment corresponding to said first signal value (r(n)), M being an integer greater than or equal to 2;
a unit (403) for determining an energy vector ($E_L$, $E_H$) comprising M components respectively corresponding to the energy values of the composite signal for the M time shifts over a determined frequency band; and
a decision unit (320) suitable for deciding whether said frequency band is free on the basis of a comparison of a distribution of energy values of the composite signal over a first frequency band relating to the M time shifts, with a distribution of energy values of the composite signal over a second frequency band relating to the M time shifts, the two frequency bands lying on either side of a reference frequency ($f_{ref}$).

9. The detection device as claimed in claim 8, furthermore comprising a determination unit (403) for determining energy distribution that includes:
a filter suitable for filtering the vectors associated with the first signal values, over a determined frequency band ($W_L$, $W_H$), and for obtaining a set of vectors ($Y_L$, $Y_H$); and
an energy calculation unit suitable for providing an energy vector ($E_L$, $E_H$) in said frequency band determined by calculating, in relation to each time shift, an energy value of the composite signal by summing the squares of the vector components of said set of vectors which correspond to said time shift.

10. The detection device as claimed in claim 8, wherein the first and second frequency bands are of the same width.

11. A piece of equipment for communication via a network comprising a detection device as claimed in claim 8.

12. A computer program intended to be installed in a detection device as claimed in claim 8, comprising instructions suitable for implementing the method as claimed in claim 1 when the program is executed by processing means of the detection device.

13. A recording medium that is read by a computer on which the computer program as claimed in claim 12 is saved.

* * * * *